Patented June 28, 1938

2,122,236

UNITED STATES PATENT OFFICE 2,122,236

WELL DRILLING FLUIDS

Arthur S. Nichols, Oak Park, and Jesse Lyle Essex, La Grange, Ill., assignors to The Illinois Clay Products Company, Joliet, Ill., a corporation of Illinois No Drawing. Application August 28, 1936, Serial No. 98,336

4 Claims. (Cl. 255—1)

This invention relates to improvements in well drilling fluids, and among other objects aims to provide an improved and efficient drilling fluid at relatively low cost.

Drilling fluids are extensively used, particularly in the rotary drilling of oil and gas wells which extend to great depths, for removing drilling cuttings, for creating a hydrostatic head against high gas pressures which are frequently encountered, for preventing erosion of the walls of the hole, for sealing porous formations, etc. Gas pressures inside the well may and frequently do exceed the hydrostatic head supplied by ordinary drilling mud made from clay and the like, and it has been necessary to increase the weight (and therefore the hydrostatic pressure) of the drilling mud by suspending therein substances which have a greater specific gravity than clay alone. Many of such substances, even though finely ground, do not by themselves remain in suspension, but require the use of certain colloids which are reputed to act as dispersing agents to maintain the weighting substances in suspension. Many available clays do not naturally contain sufficient dispersing agents for this purpose, and it has been the practice either to supplement the dispersing material of the clay by adding bentonite having a high colloidal content, or to employ bentonite as the sole source of dispersing material, particularly in regions which yield no clay or only clays having a negligible content of dispersing agents.

The present cost of synthetic drilling muds is so high as to represent a very substantial item in drilling costs, particularly where ordinary clays are not available at the drilling site. It is unnecessary to give a detailed explanation of the factors contributing to high costs; one such factor is the high washing and grinding costs of both bentonite and the weighting substance, such as iron oxide and barytes. Bentonite, although commonly so called, is not a true clay, but results from the weathering of volcanic ash and therefore contains many foreign substances which require fine grinding to render them inert or unobjectionable.

The inventive drilling fluid on the other hand is ideal from the standpoint of cost, stability of suspension and uniformity of viscosity. The weighting substances employed are air-separated by-products of the treatment of heavy metals. For example, we have found that blast furnace flue dust, the fine fraction of which is collected after leaving the blast furnace by passing it through a cyclone separator, not only possesses adequate weighting properties but chemical properties which in combination with an acid clay, presently identified, gives the drilling fluid marked stability of suspension at relatively low viscosity. Besides iron oxide, blast furnace flue dust (which is alkaline in character) contains a small percentage of lime or limestone, or both, (from the limestone charged into the furnace) and carbon or coke (in an extremely finely divided state) having a physical texture somewhat like finely divided graphite. In addition, some silica is present. The air separation of the fine fraction of the blast furnace flue dust avoids the cost of grinding, as will appear from the following screen analysis. The coarse fraction of the flue dust also possesses the same chemical properties as the fine fraction and could be employed if ground sufficiently finely.

Analysis of a typical blast furnace flue dust is:

| | Percent |
|---|---|
| Silica | 12.54 |
| Alumina | 2.12 |
| Iron oxide | 63.40 |
| Lime | 2.61 |
| Magnesia | 0.86 |
| Alkalies | 0.65 |
| Carbon | 1.64 |
| Ignition loss | 17.30 |

Screen analysis of a typical air-separated flue dust is:

| | Percent |
|---|---|
| On 30 mesh | 0.110 |
| Through 30 on 40 mesh | 0.665 |
| Through 40 on 60 mesh | 4.125 |
| Through 60 on 100 mesh | 11.050 |
| Through 100 on 150 mesh | 7.600 |
| Through 150 on 200 mesh | 1.200 |
| Through 200 on 270 mesh | 10.600 |
| Through 270 | 64.650 |
| | 100.000 |

The finely divided flue dust is mixed with varying percentages of an acid clay consisting practically entirely of the mineral, beidellite. Beidellite has been a little known clay, indeed, so little has been known about it that apparently some authors have confused it with montmorillonite, the mineral of which most bentonites are composed. However, as regards the present drilling fluid, beidellite is substantially different in its action from bentonite. Beidellite is a true clay (i. e., of rock origin) having a refractive index of 1.53 to 1.56 and a molecular silica to alumina ratio of about 5.14 and a silica to sesqui oxide (Al$_2$O$_3$+Fe$_2$O$_3$) ratio of about 10.22.

Bentonite, on the other hand, is, as stated above, not a true clay, being formed by the natural weathering of certain kinds of volcanic ash which gives it a characteristic texture under the microscope. It is alkaline in reaction and has a specific gravity of about 2.7.

Among other important differences between beidellite and bentonite, beidellite is hydrophillic and mixes readily with water. Bentonite is hydrophobic, i. e., it does not readily mix with water, although, after it has been thoroughly wetted, it is capable of absorbing large volumes of water. Fine grinding apparently aggravates its hydrophobic characteristics. Bentonite cannot be used alone as a clay for weighting drilling fluids because limiting viscosities are greatly exceeded before there is any substantial increase in weight of the fluid. A slight variation in the amount of bentonite in the drilling fluid causes wide variation in viscosity of the fluid. Despite the care used in preparing the drilling fluid with bentonite, viscosity of the fluid in any particular case is unpredictable. Beidellite, on the other hand, will alone form a very satisfactory 10.30 pound (i. e., 10.3 pounds per gallon) drilling fluid of 15 centipoise viscosity.

It should be understood, however, that viscosity of a drilling mud is not always determined by particle size. For example, there are a number of clays which have a greater percentage of colloidal material than bentonite and of course much greater than beidellite, but, nevertheless, due to the character of this colloidal content, do not develop proportionally higher viscosities. Hydrophobic colloids which characterize bentonite do not associate intimately with water and hence are sensitive to small quantities of electrolytes while hydrophyllic colloids associate intimately with water and are more resistant to flocculating influences which are so troublesome with ordinary hydrophobic muds.

It is unnecessary, however, to go into further detail respecting the differences between beidellite and bentonite, the important consideration being that beidellite will produce effects which bentonite will not. For reasons not wholly ununderstood, a drilling fluid formed from a combination of the aforesaid flue dust and beidellite possesses much greater stability of suspension than one comprising flue dust and bentonite. One theory for explaining the superior stability of the inventive drilling mud is that a chemical reaction occurs between the hydro aluminum silicate content of beidellite (which is acid in character) and the lime or limestone content of flue dust, to form calcium silicate. The latter may serve as a deflocculating agent to increase the stability of the suspension at practicable viscosities. Whether or not the foregoing is the correct theory, it has been determined that iron oxide alone will not produce with beidellite a drilling mud having the superior stability of suspension of the combination of beidellite and the aforesaid flue dust.

One satisfactory compound comprises:

| | Percent by weight |
|---|---|
| Blast furnace flue dust | 30 |
| Beidellite | 10 |

This may be mixed with water to produce a drilling mud weighing 12 pounds per gallon at a 15 centipoise viscosity.

One of the important economies accruing from the use of beidellite is that it does not require grinding to finer than 40 to 60 mesh. In its natural state beidellite is finer than 5 microns and will readily disintegrate in water to its natural fineness.

Obviously the invention is not limited to the details of the illustrative preparation since these may be variously modified. Moreover, it is not indispensable that all features of the invention be used conjointly since various features may be used to advantage in different combinations and sub-combinations.

Having described our invention, we claim:

1. The method of making a drilling fluid for oil and gas wells which is characterized by air separating blast furnace flue dust resulting from the reduction of iron ore and recovering only the fine fraction thereof, the major portion of which is finer than 200 mesh, and then mixing the same with beidellite and water to form a suspension.

2. A drilling fluid for oil and gas wells comprising a suspension of air separated flue dust produced by a blast furnace in the reduction of iron ore with beidellite.

3. A drilling fluid for oil and gas wells comprising in combination blast furnace flue dust containing a major proportion of iron oxide and minor amounts of alumina silica and compounds of calcium and magnesium suspended beidellite.

4. The method of making a drilling fluid for oil and gas wells comprising suspending in air blast furnace flue dust resulting from the reduction of iron ore and recovering therefrom only the fine fraction thereof, and then mixing the same with beidellite to form a suspension.

ARTHUR S. NICHOLS.
JESSE LYLE ESSEX.